(12) United States Patent
Fushimi et al.

(10) Patent No.: US 7,204,613 B2
(45) Date of Patent: Apr. 17, 2007

(54) PROJECTION DISPLAY DEVICE

(75) Inventors: Yoshimasa Fushimi, Neyagawa (JP);
Yoshihiro Masumoto, Kobe (JP);
Mitsuhiro Wada, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 92 days.

(21) Appl. No.: 10/474,987

(22) PCT Filed: Mar. 7, 2002

(86) PCT No.: PCT/JP02/02100

§ 371 (c)(1),
(2), (4) Date: Oct. 15, 2003

(87) PCT Pub. No.: WO03/075089

PCT Pub. Date: Sep. 12, 2003

(65) Prior Publication Data
US 2004/0125600 A1 Jul. 1, 2004

(51) Int. Cl.
*F21S 8/00* (2006.01)
*F21V 8/00* (2006.01)

(52) U.S. Cl. .................. 362/268; 349/5; 348/798; 353/30; 353/102; 362/318

(58) Field of Classification Search .......... 362/268, 362/561, 318, 812; 353/98, 99, 102, 39, 353/37, 31, 30; 349/5; 348/798
See application file for complete search history.

(56) References Cited

U.S. PATENT DOCUMENTS 6,113,240 A * 9/2000 Iizuka ................. 353/31
6,118,501 A 9/2000 Ohzawa
6,129,437 A 10/2000 Koga et al.
6,193,376 B1 2/2001 Hayashi et al.
6,439,726 B1 8/2002 Piehler
6,461,001 B2 * 10/2002 Okamori et al. .......... 353/102

FOREIGN PATENT DOCUMENTS

| JP | 10-228063 | 8/1998 |
| JP | 11-249069 | 9/1999 |
| JP | 2000-098272 | 4/2000 |

(Continued)

*Primary Examiner*—John Anthony Ward
(74) *Attorney, Agent, or Firm*—Hamre, Schumann, Mueller & Larson, P.C.

(57) ABSTRACT

A projection type display apparatus is composed of a light source (101), an illumination optical system (102) for forming illumination light, a reflection type light valve (106) for reflecting the illumination light to form an optical image, a projection optical system (107) for projecting the optical image, and a lens (105) with a positive power. An optical axis (115) of the reflection type light valve, an optical axis (113) of the projection optical system, and an optical axis (114) of the lens with a positive power are matched with each other. The illumination optical system (102) is placed so that the illumination light passes through the lens (105) with a positive power and is reflected from the reflection type light valve (106). An output pupil (108) of the illumination optical system (102) and an entrance pupil (109) of the projection optical system (107) are placed so as to have a conjugate relationship with respect to the lens (105) with a positive power.

8 Claims, 10 Drawing Sheets

FOREIGN PATENT DOCUMENTS

| | | |
|---|---|---|
| JP | 2000-258839 | 9/2000 |
| JP | 2000-310751 | 11/2000 |
| JP | 2001-133881 | 5/2001 |
| JP | 2001-166292 | 6/2001 |
| JP | 2002-250894 | 9/2002 |
| WO | 98/29773 | 7/1998 |

* cited by examiner

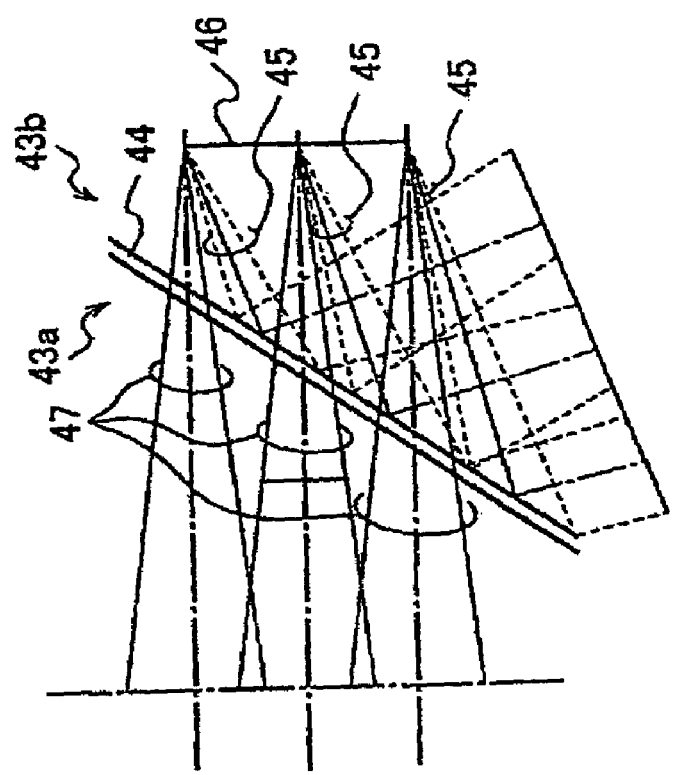
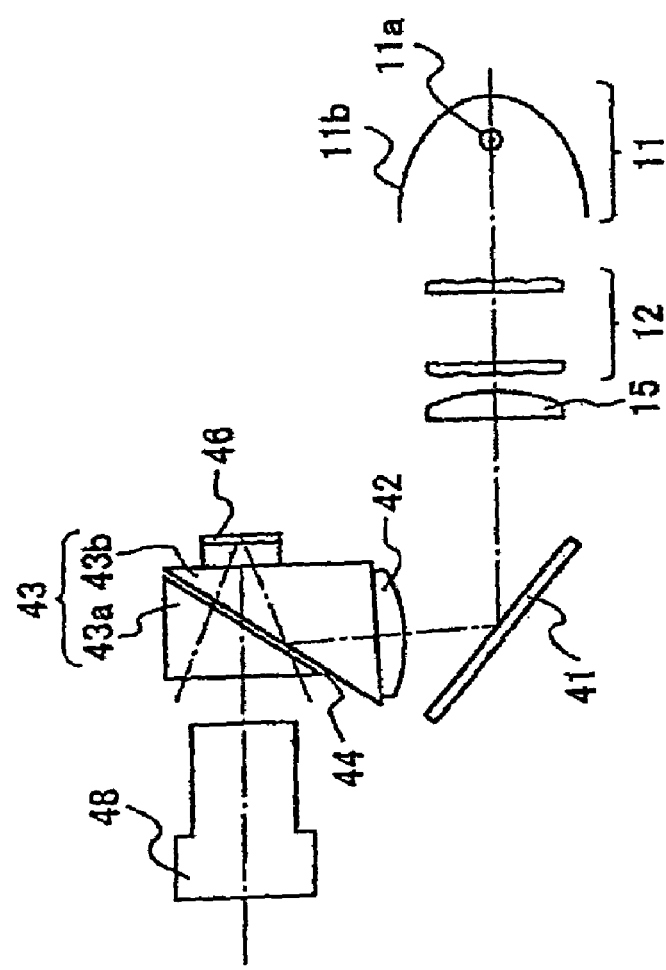
FIG.9A  PRIOR ART
FIG.9B

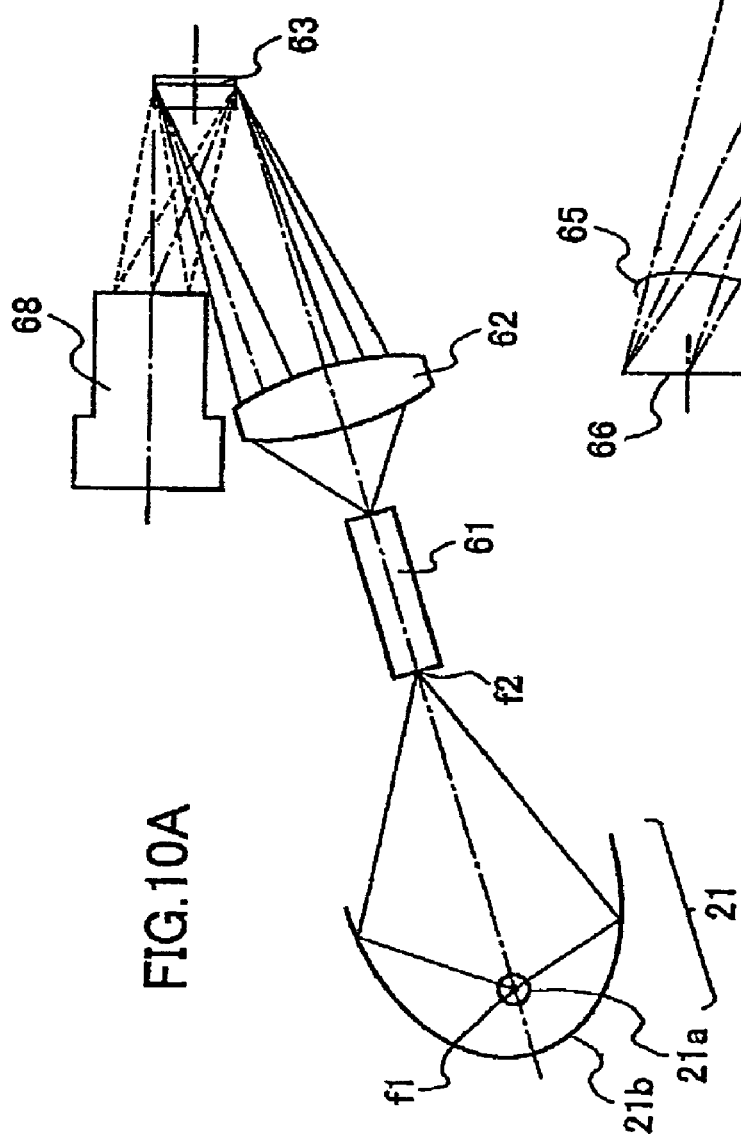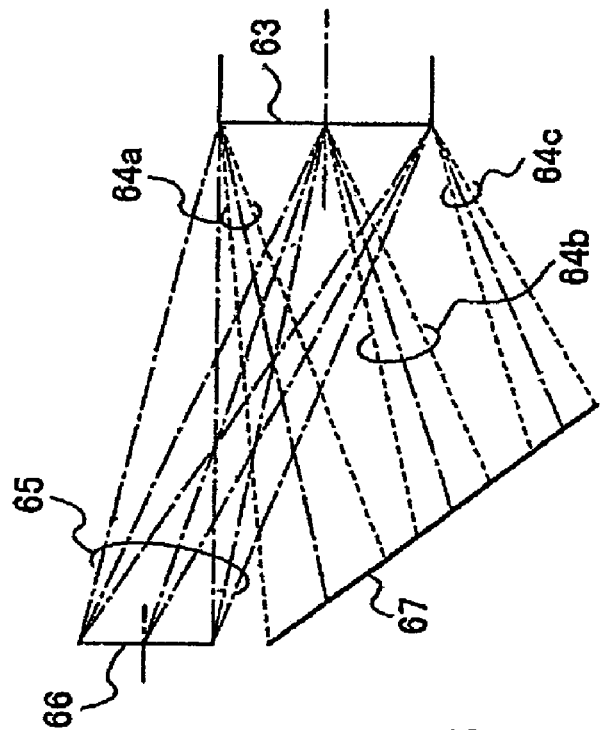
FIG. 10A
FIG. 10B
PRIOR ART

PROJECTION DISPLAY DEVICE

TECHNICAL FIELD

The present invention relates to a projection type display apparatus.

BACKGROUND ART

As a method for obtaining a large screen image, it is well known conventionally that an optical image is formed on a reflection type light valve in accordance with a video signal, and the optical image is irradiated with light to be projected on a screen in an enlarged state by a projection lens system. If a reflection type light distribution correction element (reflection type light valve) for forming an image by controlling the traveling direction of light in accordance with a video signal is used, a projected image with a more efficient light use and a higher brightness can be displayed.

FIG. 6 shows an example of an optical system of a conventional projection type display apparatus using a reflection type light valve. As shown in FIG. 6, a light source 1 is composed of a lamp 1a and a concave mirror 1b. The concave mirror 1b is a parabolic mirror, which is formed by vapor-depositing an optical multilayer film that transmits infrared light and reflects visible light on an inner surface of a glass substrate. The lamp 1a is disposed so that the center of its illuminator is positioned at a focal point f1 of the concave mirror 1b. The light radiated from the lamp 1a is reflected from the concave mirror 1b and travels to an illumination optical system 2.

The illumination optical system 2 is composed of a first lens array 3 and a second lens array 4. The first lens array 3 and the second lens array 4 respectively are composed of a plurality of lens elements. The first lens array 3 and the second lens array 4 are placed so that each lens element constituting the first lens array 3 forms an illuminator image on each corresponding lens element of the second lens array 4 with light incident upon the illumination optical system 2. The light incident upon the illumination optical system 2 is split into a plurality of luminous fluxes by the first lens array 3 and the second lens array 4. Thereafter, the luminous fluxes are overlapped with each other by a field lens 5 to be incident upon a polarization beam splitter 6.

The light incident upon the polarization beam splitter 6 has only a light beam in a particular polarization direction reflected, and this is incident perpendicularly upon a display region of a reflection type light valve 7. The reflection type light valve 7 is a reflection type liquid crystal panel, and changes a reflectance of polarized light in accordance with a video signal to form an optical image. Output light 9 from the reflection type light valve 7 has a polarization direction rotated by 90° with respect to the incident light 8 to be output. The output light 9 is incident upon a projection lens system 10 after passing through the polarization beam splitter 6, and an optical image on the reflection type light valve 7 is projected onto a screen (not shown) by the projection lens system 10.

FIG. 7 shows another example of an optical system of a conventional projection type display apparatus using a reflection type light valve. The light source 1, the illumination optical system 2, and the field lens 5 shown in FIG. 7 are the same as those shown in FIG. 6. The light output from the field lens 5 passes through a relay lens system 21, is reflected from a mirror 22, and passes through a projection optical system back group 23 to illuminate the reflection type light valve 24.

The reflection type light valve 24 is a reflection type liquid crystal panel similar to that shown in FIG. 6, which changes a reflectance of polarized light in accordance with a video signal to form an optical image. A projection lens system 25 is composed of a projection optical system front group 26 and the projection optical system back group 23. The optical image on the reflection type light valve 24 is projected on a screen (not shown) in an enlarged state by the projection lens 25. In the projection type display apparatus, illumination light illuminates the reflection type light valve 24 in a direction tilted from the normal direction to the display region of the reflection type light valve 24. Therefore, the illumination light 27 and projected light 28 do not share an optical path.

As the reflection type light valve, a DMD (Digital Micro Mirror Device) is being given attention. The DMD has a configuration in which a plurality of minute reflection mirrors (hereinafter, referred to as "micro mirrors") are disposed two-dimensionally on a silicon substrate, and each micro mirror constitutes a pixel. Each micro mirror is configured so as to move like a seesaw in a range of ±10° by two rotation spindles provided in a diagonal direction at a diagonal position of a pixel. For example, it is assumed that the state where a micro mirror is tilted at +10° is ON, and the state where a micro mirror is tilted at −10° is OFF. The DMD tilts each micro mirror at +10° or −10° in accordance with a video signal, thereby controlling the output direction of a light beam to form an optical image.

FIG. 8 shows an operation state of micro mirrors constituting the respective pixels of a conventional DMD. FIG. 8 shows a cross-section taken along a surface perpendicular to a rotation spindle of each micro mirror of the DMD. The counterclockwise direction corresponds to a rotation positive direction of a micro mirror. In FIG. 8, reference numerals 31 to 36 denote micro mirrors that constitute the respective pixels. Reference numeral 37 denotes a part of a projection lens system.

In the example shown in FIG. 8, the micro mirrors 31, 33, and 36 are tilted at +10° (n a counterclockwise direction) with respect to a reference surface 38 of the reflection type light valve (DMD), whereby they are in an ON state. Therefore, incident light 39 reflected from the micro mirrors 31, 33, and 36 is incident upon the projection lens system 37. On the other hand, the micro mirrors 32, 34, and 35 are tilted at −10° (in a clockwise direction) with respect to the reference surface 38 of the reflection type light valve, whereby they are in an OFF state. Therefore, the incident light 39 reflected from the micro mirrors 32, 34, and 35 is not incident upon the projection lens system 37. Such a DMD has useful characteristics, i.e., it can use natural light, and has a high light use efficiency and a high response speed, compared with a liquid crystal panel using polarized light.

WO 98-29773 shows a configuration example of an optical system of a projection type display apparatus using a DMD as a reflection type light valve. FIG. 9A shows a schematic configuration of a projection type display apparatus using a conventional DMD. FIG. 9B shows a portion in the vicinity of the reflection type light valve in an enlarged state. FIG. 9A shows a cross-section taken along a surface perpendicular to a rotation spindle of each micro mirror of the reflection type light valve 46.

First, a description will be made with reference to FIG. 9A. A light source 11 is composed of a concave mirror 11b and a lamp 11a in the same way as the light source 1 shown in FIG. 6. The concave mirror 11b is the same as the concave mirror 1b shown in FIG. 6 except that the concave mirror 11b is an elliptical mirror. The concave mirror 11b is formed by vapor-depositing an optical multilayer film that transmits infrared light and reflects visible light on an inner surface of a glass substrate. The lamp 11a is disposed so that the center of its illuminator is positioned at a first focal point (not shown) of the concave mirror 11b.

Light radiated from the lamp 11a is reflected from the concave mirror 11b, and travels to a second focal point (not shown) of the concave mirror 11b. The light output from the lamp 11a forms an illuminator image at the second focal point of the concave mirror 11b. The light passing through the second focal point is incident upon an illumination optical system 12 and is split into a plurality of luminous fluxes. Thereafter, the luminous fluxes are incident upon a relay lens 15 to be overlapped with each other. The illumination optical system 12 is configured in the same way as the illumination optical system 2 shown in FIG. 6.

The light output from the relay lens 15 is reflected from a total reflection mirror 41 to be incident upon a total reflection prism 43 via a field lens 42. The total reflection prism 43 is composed of two single prisms 43a and 43b separated by an air layer 44. Reference numeral 48 denotes a projection lens system.

Next, a description will be made with reference to FIG. 9B. Incident light 45 that is incident upon the total reflection prism 43 is totally reflected from an interface between the single prism 43b and the air layer 44 to travel to the reflection type light valve 46. The reflection type light valve 46 controls the traveling direction of light in accordance with a video signal to form an optical image. Reflected light 47 from the reflection type light valve 46 is output as luminous fluxes having a principal ray perpendicular to a display region of the reflection type light valve 46, passes through the total reflection prism 43 without being reflected from the interface between the single prism 43b or 43a and the air layer 44, and is incident upon the projection lens system 48 (see FIG. 9A). As a result, the optical image on the reflection type light valve 46 is projected on a screen in an enlarged state by the projection lens system 48.

However, in the projection type display apparatus shown in FIG. 6, the reflection type liquid crystal panel used as the reflection type light valve 7 has characteristics of reflecting illumination light, which is incident upon a substrate surface perpendicularly, in a direction perpendicular to the substrate surface. Therefore, the illumination light (incident light 8) and the projected light (output light 9) pass through substantially the same optical path in opposite directions. This makes it necessary to provide means for separating the incident light 8 from the output light 9, such as the polarization beam splitter 6 as shown in FIG. 6. The polarization beam splitter 6 is composed of a large glass block and a multilayer film. Therefore, in the projection type display apparatus shown in FIG. 6, there is a problem of high cost.

Furthermore, the polarization beam splitter 6 separates the output light 9 from the reflection type light valve 7, from the incident light 8 based on the direction of a polarization plane. If there is nonuniformity in a medium constituting a prism, unnecessary light components are generated to decrease a contrast. Furthermore, the polarization beam splitter 6 separates only components having different polarization directions. Therefore, it is necessary to previously align the polarization plane of the incident light 8. Therefore, it is necessary to introduce means for aligning a polarization plane of the incident light 8, which increases cost. On the other hand, in the case where means for aligning a polarization plane is not introduced, a light use efficiency is decreased remarkably to ½ or less.

In the projection type display apparatus shown in FIG. 7, the illumination light 27 incident upon the reflection type light valve 24 and the projected light 28 output therefrom do not share an optical path. Therefore, there is an advantage that it is not necessary to provide a polarization beam splitter. However, in the projection type display apparatus shown in FIG. 7, two projection optical systems for illumination light and projected light are required, so that an F-number required in a projection optical system becomes twice that of the example in FIG. 6. This makes it necessary to enlarge a lens constituting the projection optical system, and to increase the number of lenses so as to ensure performance, leading to enlargement of an optical system and an increase in cost.

On the other hand, if the projection type display apparatus shown in FIG. 9 is used, a problem involved in optical paths of illumination light and projected light and a problem of enlargement of the projection optical system can be solved. However, the projection type display apparatus shown in FIG. 9 requires the total reflection prism 43 for separating illumination light from projected light, resulting in an increase in cost. Furthermore, the total reflection prism 43 includes a minute air layer, so that the resolution characteristics of the projection lens 48 are influenced greatly by the tolerance of the air layer.

In order to solve the above-mentioned problem, JP 2000-98272 A discloses a configuration in which a projection optical system is designed as a non-telecentric type, and illumination is generated in accordance therewith. FIG. 10A shows a schematic configuration of a conventional projection type display apparatus in which a projection optical system is designed as a non-telecentric type. FIG. 10B shows a portion in the vicinity of a reflection type light valve in an enlarged state. In the projection type display apparatus shown in FIG. 10B, a DMD is used as a reflection type light valve 63. FIG. 10B shows a cross-section taken along a surface perpendicular to a rotation spindle of each micro mirror of the reflection type light valve 63.

As shown in FIG. 10A, a light source 21 is composed of a lamp 21a and a concave mirror 21b in the same way as the light source shown in FIG. 6. The concave mirror 21b is an elliptical mirror, which is the same as the concave mirror 11b shown in FIG. 9. The lamp 21 is disposed so that the center of its illuminator is positioned at a first focal point f1 of the concave mirror 21b. In the same way as the example shown in FIG. 6, light radiated from the lamp 21 is reflected from the concave mirror 21b to form an illuminator image at a second focal point f2 of the concave mirror 21b. The light passing through the second focal point f2 is incident upon a rod lens 61 to be made uniform. The illumination light that has been made uniform by the rod lens 61 passes through a relay lens 62.

As shown in FIG. 10B, the illumination light passing through the relay lens 62 passes through an output plane 67 of an illumination optical system to be incident upon the reflection type light valve 63 at a predetermined incident angle. The reflection type light valve 63 controls the traveling direction of light in accordance with a video signal to form an optical image. The incident light 64a to 64c incident on the reflection type light valve 63 is reflected respectively at predetermined angles, and reflected light (output light) 65 is projected on a screen by a projection lens system 68 in an enlarged state. Reference numeral 66 denotes a pupil of the projection optical system.

Thus, the projection type display apparatus shown in FIG. 10 uses a projection optical system of a non-telecentric type and does not require a total reflection prism. Therefore, it is considered that the cost can be decreased more than that of the projection type display apparatus shown in FIG. 9.

However, in the configuration of the reflection type display apparatus shown in FIG. 10, the normal directions of the reflection surfaces of micro mirrors become constant over the display region of the reflection type light valve 63. Therefore, when the optical axis of the reflection type light valve 63 is substantially matched with that of the projection optical system, the optical paths of the incident light and output light are overlapped with each other. Because of this, it is physically difficult to obtain a satisfactory image with uniform illumination, and the optical axis of the projection optical system needs to be offset from that of the reflection type light valve 63 so as to separate the incident light 64 from the output light 65. Thus, the projection optical system projects an image in an axially shifted manner, which requires enlargement of an effective display region. Consequently, the optical system is enlarged, leading to an increase in cost. Furthermore, there is a problem that front projection cannot be performed.

Furthermore, JP 11(1999)-249069 A discloses a projection type display apparatus in which immediately before a display region of a reflection type light valve, a condenser lens having incidence-reflection characteristics varied depending upon the display region is placed with its optical axis deflected from that of the projection optical system. In this projection type display apparatus, a double F-number is not required in the projection optical system, and optical paths of incident light and output light are not overlapped with each other.

However, in the projection type display apparatus, the condenser lens constituting a part of the projection optical system needs to be deflected. Therefore, when it is attempted to obtain satisfactory resolution characteristics over the projected image region, a complicated lens configuration is required. Furthermore, in order to obtain a satisfactory resolution, the reflection type light valve is tilted at 2° to 8° with respect to the optical axis of the projection optical system. However, according to the "Shineproof Theorem", it is considered that a projected image of the reflection type light valve also is tilted with respect to the optical axis of the projection optical system. Therefore, in the case where the display region of the reflection type light valve is in a rectangular shape, the projected image on a surface perpendicular to the optical axis has a trapezoidal shape; accordingly, it may be difficult to obtain a satisfactory display image.

The object of the present invention is to solve the above-mentioned problem and provide a small projection type display apparatus including a reflection type light valve, in which an optical path of incident light and that of output light can be prevented from being overlapped with each other in the reflection type light valve, and a projected image of high quality can be obtained.

DISCLOSURE OF INVENTION

In order to achieve the above-mentioned object, a projection type display apparatus according to the present invention includes: a light source; an illumination optical system for condensing light radiated from the light source to form illumination light; a reflection type light valve for reflecting the illumination light to form an optical image; a projection optical system for projecting the optical image formed by the reflection type light valve; and a lens with a positive power positioned between the reflection type light valve and the projection optical system, wherein the reflection type light valve, the projection optical system, and the lens with a positive power are disposed so that optical axes thereof are matched with each other, the illumination optical system is disposed so that the illumination light passes through the lens with a positive power to be reflected from the reflection type light valve, and an output pupil of the illumination optical system and an entrance pupil of the projection optical system have a conjugate relationship with respect to the lens with a positive power.

In the above-mentioned projection type display apparatus according to the present invention, the projection optical system has a diaphragm deflected with respect to the optical axis of the projection optical system, and the illumination optical system is disposed so that the illumination light passes through the lens with a positive power to be reflected from the reflection type light valve, and light constituting the optical image from the reflected illumination light passes through the diaphragm.

In the above embodiment, it is preferable that the diaphragm of the projection optical system is deflected in a direction away from the optical axis of the illumination optical system. Furthermore, it is preferable that the projection optical system has means for adjusting a focal point with only movement in an optical axis direction. Furthermore, it is preferable that the following Equation (1) is satisfied:

$$F1=1/(2 \sin(\theta_1+\alpha)) \qquad (1)$$

where F1 is an F-number of the projection optical system, $\theta_1$ is a spread angle of light that is output from the illumination optical system and is reflected from the reflection type light valve to be incident upon the projection optical system, and a is an angle formed by a principal ray output from a center of a display region of the reflection type light valve and the optical axis of the projection optical system.

Furthermore, in the above-mentioned projection type display apparatus according to the present invention, the output pupil of the illumination optical system may have a plurality of partial pupil elements, and a luminous flux distribution of the illumination light may become uniform when the illumination light is reflected from the reflection type light valve.

Furthermore, in the above-mentioned projection type display apparatus according to the present invention, it also is preferable that the output pupil of the illumination optical system, the entrance pupil of the projection optical system and the lens with a positive power are disposed so that 80% or more of luminous fluxes passing through the output pupil of the illumination optical system is incident upon an effective region of the entrance pupil of the projection optical system. Furthermore, it also is preferable that the lens with a positive power is composed of one plano-convex lens with a convex surface directed to a display region of the reflection type light valve.

BRIEF DESCRIPTION OF DRAWINGS

FIG. 9A is a view showing a schematic configuration of a projection type display apparatus using a conventional DMD element, and FIG. 9B is an enlarged view showing a portion in the vicinity of a reflection type light valve.

FIG. 10A is a view showing a schematic configuration of a conventional projection type display apparatus in which a projection optical system is designed as a non-telecentric type, and FIG. 10B is an enlarged view showing a portion in the vicinity of a reflection type light valve.

BEST MODE FOR CARRYING OUT THE INVENTION

Embodiment 1

Figure 1:
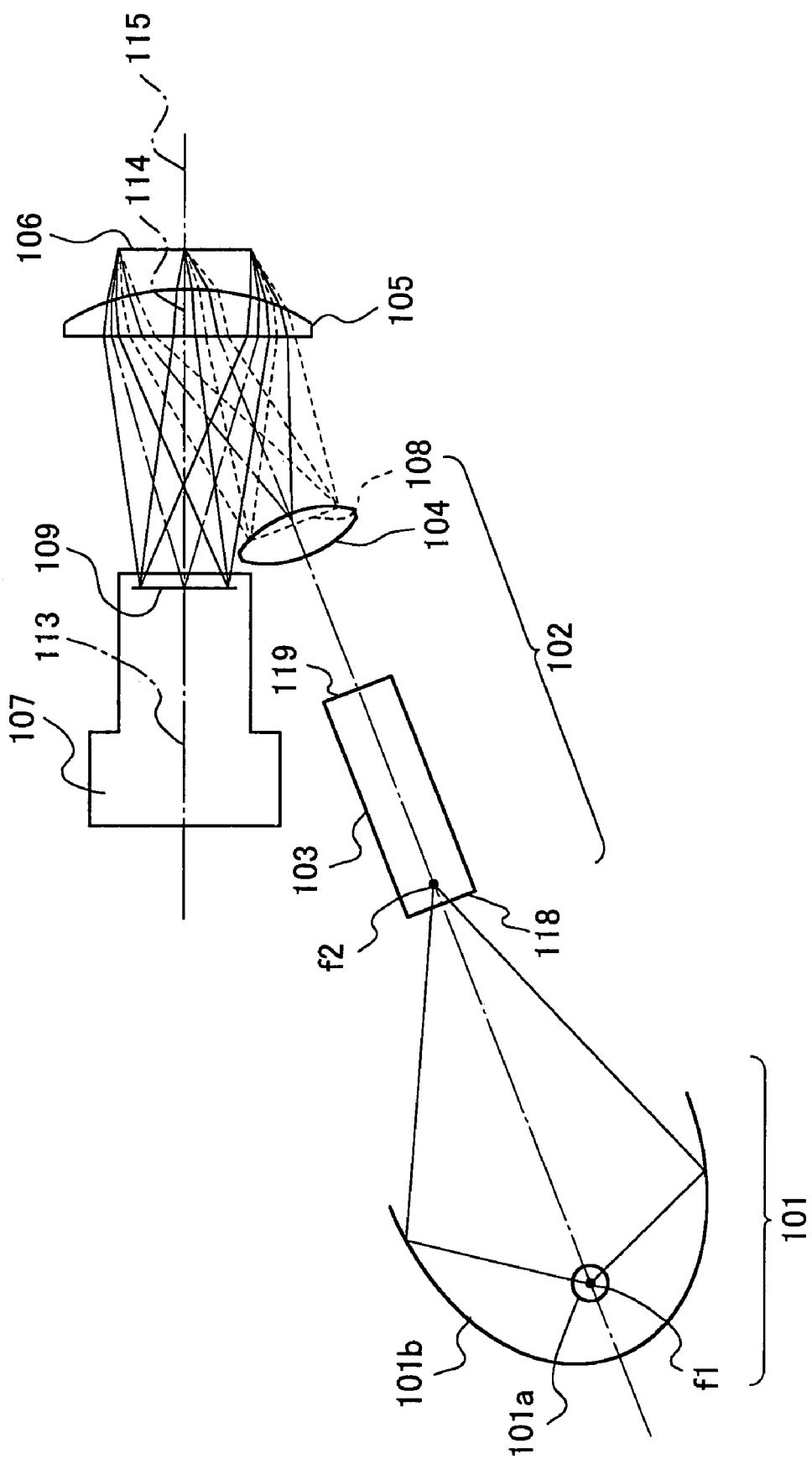
FIG. 1 is a view showing a configuration of a projection type display apparatus according to Embodiment 1 of the present invention.
Figure 2:
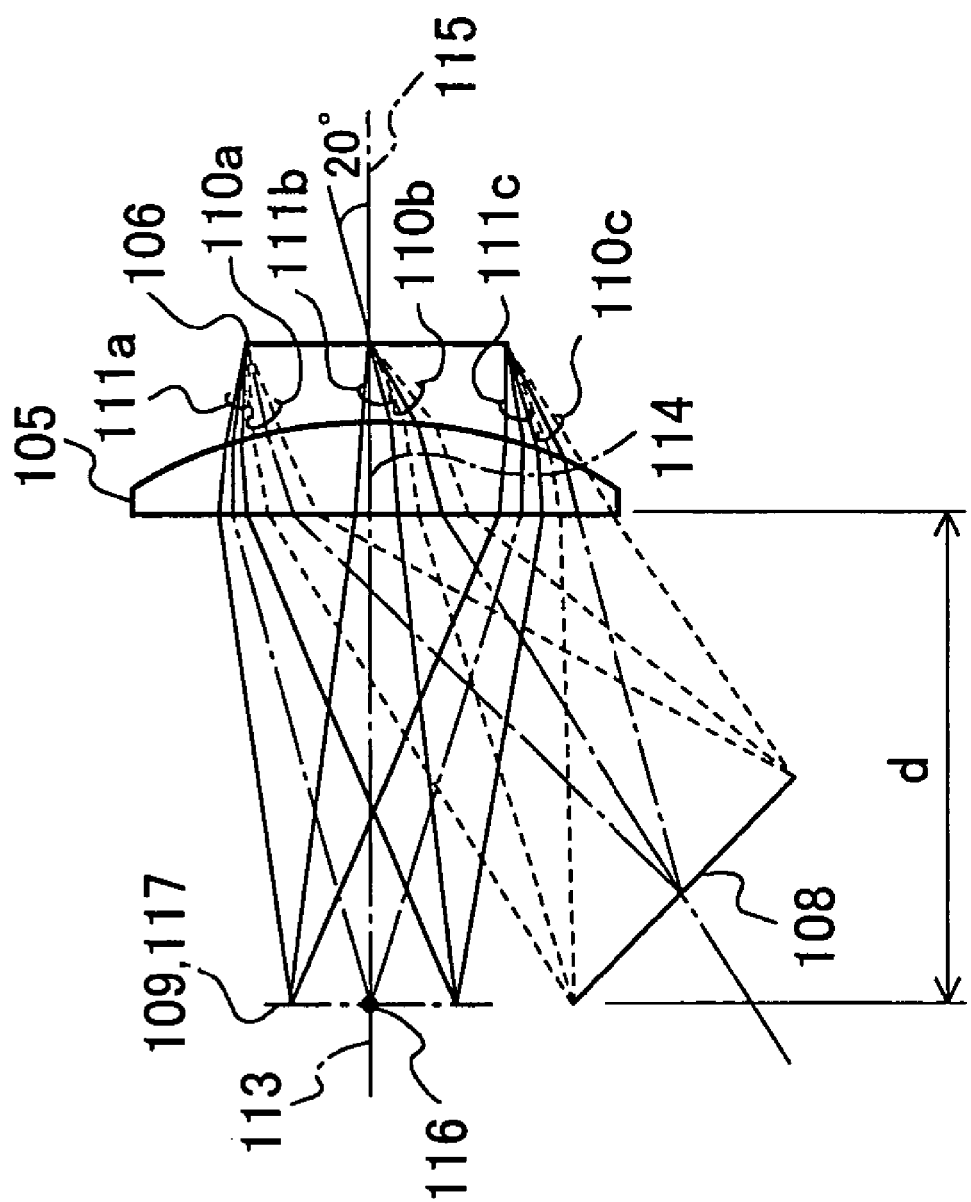
FIG. 2 is an enlarged view showing a portion in the vicinity of a reflection type light valve constituting the projection type display apparatus shown in FIG. 1.
Figure 8:
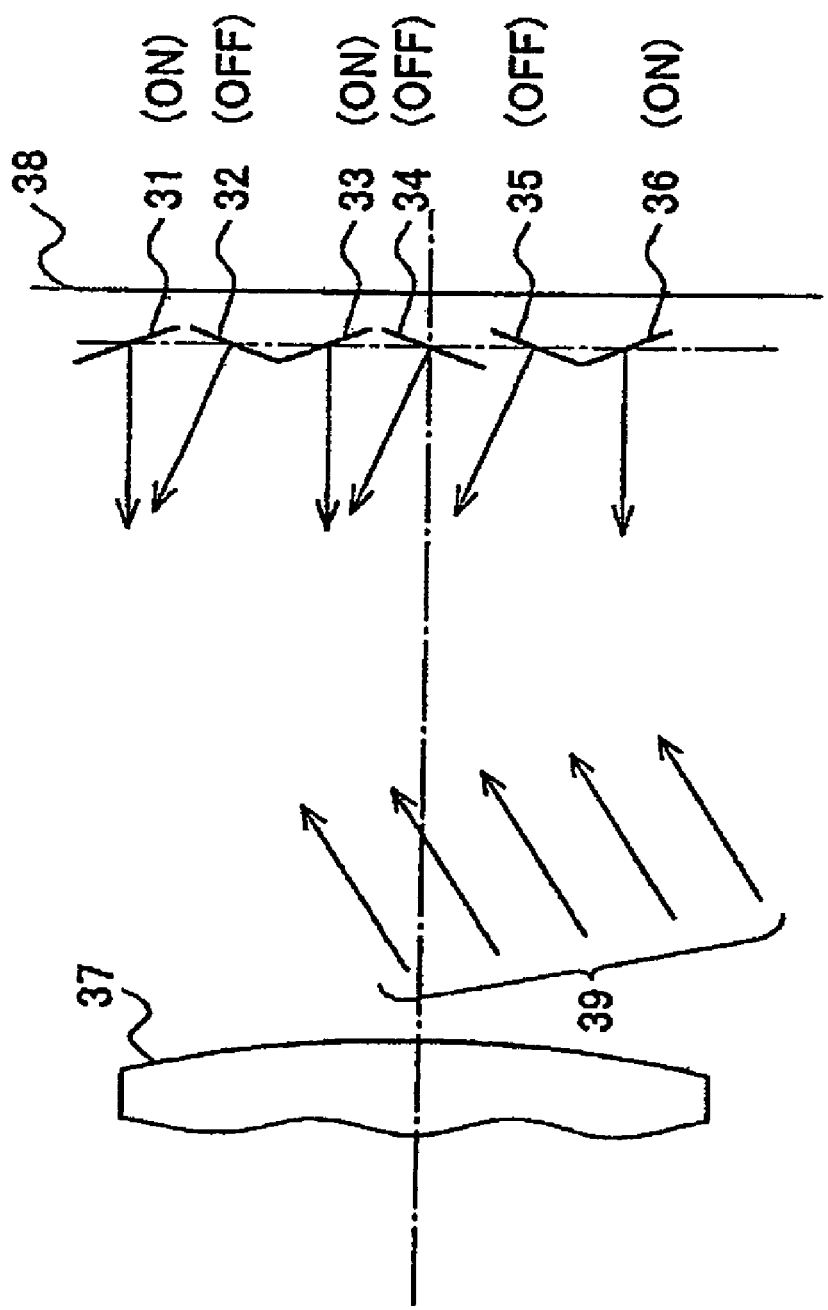
FIG. 8 is a view showing an operation state of micro mirrors constituting the respective pixels of a conventional DMD.

Hereinafter, a projection type display apparatus according to Embodiment 1 of the present invention will be described with reference to FIGS. 1 and 2. FIG. 1 is a view showing a configuration of the projection type display apparatus according to Embodiment 1 of the present invention. FIG. 2 is an enlarged view showing a portion in the vicinity of a reflection type light valve constituting the projection type display apparatus shown in FIG. 1. In Embodiment 1, a DMD similar to that shown in FIG. 8 is used as a reflection type light valve, and FIGS. 1 and 2 show cross-sections taken along a surface perpendicular to a rotation spindle of micro mirrors constituting the DMD. Furthermore, the movable range of the micro mirrors is ±10°.

First, the configuration and operation of the projection type display apparatus according to Embodiment 1 will be described with reference to FIG. 1. As shown in an example in FIG. 1, the projection type display apparatus according to Embodiment 1 at least includes a light source 101, an illumination optical system 102 for condensing light radiated from the light source 101 to form illumination light, a reflection type light valve (spatial light modulator) 106 for reflecting the illumination light to form an optical image, a projection optical system 107 for projecting the optical image formed by the reflection type light valve 106, and a lens 105 with a positive power positioned between the reflection type light valve 106 and the projection optical system 107.

Furthermore, as shown in the example in FIG. 1, the reflection type light valve 106, the projection optical system 107, and the lens 105 with a positive power are placed so that optical axes (115, 113, 114) thereof are matched with each other. In the present specification, the phrase "optical axes are matched with each other" includes not only the case where they are matched perfectly, but also the case having an error in an acceptable range. Furthermore, the illumination optical system 102 is placed so that illumination light passes through the lens 105 with a positive power and is reflected from the reflection type light valve 106. An output pupil 108 of the illumination optical system 102 and an entrance pupil 109 of the projection optical system 107 have a conjugate relationship with respect to the lens 105 with a positive power.

In the example in FIG. 1, the light source 101 is composed of a lamp 101a and a concave mirror 101b. The concave mirror 101b is a parabolic mirror, which is formed by vapor-depositing an optical multiplayer film that transmits infrared light and reflects visible light on an inner surface of a glass substrate in an umbrella shape. The lamp 101a is placed so that the center of its illuminator is positioned at a first focal point f1 of the concave mirror 101b. The light radiated from the lamp 101a is reflected from the concave mirror 101b to form an illuminator image at a second focal point f2 of the concave mirror 101b.

The illumination optical system 102 is composed of a rod lens 103 and a relay lens system 104. The second focal point f2 of the concave mirror 101b is substantially matched with a plane of incidence 118 of the rod lens 103. The light incident upon the rod lens 103 repeats multiple reflection on an inner surface of the rod lens 103. Therefore, luminous fluxes having a nonuniform light amount on the plane of incidence 118 of the rod lens 103 are made uniform on an output plane 119 of the rod lens 103. The light output from the rod lens 103 is incident upon the relay lens system 104, and output from the relay lens system 104 to the reflection type light valve 106.

The light output from the relay lens system 104 passes through the lens 105 with a positive power, and is reflected from the reflection type light valve 106. The output plane 119 of the rod lens 103 and the display region of the reflection type light valve 106 have a conjugate relationship in an optical system composed of a combination of the relay lens system 104 and the lens 105 with a positive power. The output light from the reflection type light valve 106 passes through the lens 105 with a positive power to be incident upon the projection optical system 107, and the optical image on the reflection type light valve 106 is projected on a screen in an enlarged state.

Next, the principle of the projection type display apparatus of the present invention will be described with reference to FIG. 2. As described with reference to FIG. 1, luminous fluxes condensed by the light source 101 and made uniform and shaped by the illumination optical system 102 are output from an output pupil 108 of the illumination optical system 102. More specifically, as shown in FIG. 2, a luminous flux 110a illuminating an upper portion of the reflection type light valve 106, a luminous flux 110b illuminating a central portion of the reflection type light valve 106, and a luminous flux 110c illuminating a lower portion of the reflection type light valve 106 are output from the output pupil 108 of the illumination optical system 102. The "upper portion", "central portion", and "lower portion" as used in the present specification refer to a positional relationship in the figure. Furthermore, in FIG. 2, the luminous fluxes (110a to 110c) are indicated by only representative light beams such as an upper ray output from the upper end of the output pupil 108, a principal ray output from the center of the output pupil 108, and a lower ray output from the lower end of the output pupil 108.

The luminous fluxes (110a to 110c) pass through the lens 105 with a positive power to be incident upon the reflection type light valve 106. Therefore, among the light beams output from the output pupil 108, the luminous flux 110a illuminating the upper portion of the reflection type light valve is refracted by the lens 105 with a positive power in such a direction that an angle formed between the luminous flux 110a and an optical axis 114 of the lens with a positive power becomes smaller than that before the luminous flux 110a is refracted by the lens 105 with a positive power to be incident upon the lens 105 with a positive power. On the other hand, the luminous flux 110c illuminating the lower portion of the reflection type light valve 105 is refracted by the lens 105 with a positive power in such a direction that an angle formed between the luminous flux 110c and the optical axis 114 becomes larger. Therefore, the luminous fluxes 110a, 110b, and 110c passing through the lens 105 with a positive power become telecentric illumination light in which the respective principal rays are substantially parallel to each other and an angle formed between the respective principal rays and an optical axis 114 of the reflection type light valve 105 is about 20°. Furthermore, a spread angle of each luminous flux also becomes substantially equal.

Each micro mirror of the reflection type light valve 106 is designed so as to be tilted at 10° in a counterclockwise direction with respect to a surface perpendicular to the optical axis 114 of the lens 105 with a positive power when the micro mirrors are in an ON state. Since the illumination light is telecentric, when the micro mirrors are in an ON state, the principal rays of luminous fluxes 111a, 111b, and 111c of the reflected light from the reflection type light valve 105 are substantially parallel to the optical axis 115 of the reflection type light valve 106 and become telecentric in any display region of the reflection type light valve 106. Any of the luminous fluxes 111a, 111b, and 111c of the output light from the reflection type light valve pass through the lens 105 with a positive power to be incident upon an entrance pupil 109 of the projection optical system 107. The light incident upon the entrance pupil 109 of the projection optical system 107 is projected on a screen by the projection optical system in an enlarged state.

Thus, in the projection type display apparatus according to Embodiment 1, since the lens 105 with a positive power is used, even if a telecentric optical system is used, the entrance pupil 109 of the projection optical system 107 and the output pupil 108 of the illumination optical system 102 can be made small. Furthermore, the optical path of incident light and the optical path of output light can be separated from each other without using a prism. Therefore, front projection can be realized.

Furthermore, as described above, the optical axis 115 of the reflection type light valve 106, the optical axis 113 of the projection optical system 107, and the optical axis 114 of the lens 105 with a positive power are matched with each other, so that the principal rays of the luminous fluxes 111a, 111b, and 111c pass through a focal point 116 of the lens 105 with a positive power. Furthermore, as described above, the output pupil 108 of the illumination optical system 102 and the entrance pupil 109 of the projection optical system 107 have a conjugate relationship with respect to the lens 105 with a positive power, and a focal plane 117 of the lens 105 with a positive power is matched with the entrance pupil 109 of the projection optical system 107. Therefore, in the projection type display apparatus according to Embodiment 1, peripheral light can be prevented from being eclipsed by the projection optical system 107 without being able to pass therethrough, and a projected image can obtain the maximum brightness. Furthermore, a distance "d" from a final plane of the lens 105 or the apex of the final plane of the lens 105 with a positive power to the entrance pupil 109 of the projection optical system 107 is substantially matched with a back focus of the lens 105 with a positive power.

Furthermore, in Embodiment 1, it is preferable that the output pupil 108 of the illumination optical system 102 also is placed in the vicinity of the focal plane 117 of the lens 105 with a positive power so that the illumination light incident upon the reflection type light valve 106 is telecentric, and the illumination light can be transmitted without any loss.

The phrase "the output pupil of the illumination optical system and the entrance pupil of the projection optical system have a conjugate relationship with respect to the lens with a positive power" as used in the present specification refers to not only the case where the entrance pupil 109 of the projection optical system 107 is matched with the focal plane 116 of the lens 105 with a positive power as shown in FIG. 2, but also the case where the entrance pupil 109 forms an image at a position of the output pupil 108 of the illumination optical system 102 by an image-forming system composed of the lens 105 with a positive power and the reflection type light valve 106. In Embodiment 1, it is preferable that the output pupil 108, the entrance pupil 109, and the lens 105 with a positive power are placed so that a portion of 80% or more of an effective region of the entrance pupil 109 is projected in an effective region of the illumination optical system 102, i.e., 80% or more of luminous fluxes passing through the output pupil 108 are incident upon an effective region of the entrance pupil 109.

In Embodiment 1, it is preferable to use the lens 105 with a positive power having a focal length of about 40 mm to 80 mm for the following reason. If such a lens 105 with a positive power is used, an appropriate power is obtained, and the luminous fluxes from the output pupil 108 of the illumination optical system 102 can be separated precisely from the luminous fluxes incident upon the entrance pupil 109 of the projection optical system 107 output from the reflection type light valve 106. The focal length of the lens 105 with a positive power can be selected appropriately in accordance with the angle formed by the incident light to the reflection type light valve 106 and the output light from the reflection type light valve 106, the F-number of the incident light to the reflection type light valve 106, and the F-number of the output light from the reflection type light valve 106.

When the reflection type light valve 106 is in an ON state, the light (ON light) reflected from the reflection type light valve 106 is incident upon the projection optical system 107. On the other hand, when the reflection type light valve 106 is in an OFF state, the reflected light (OFF light) is output in a direction at −40° (clockwise direction) with respect to the optical axis 115. The OFF light is similarly incident upon the lens 105 with a positive power. However, the output direction of the OFF light is different from that of the ON light. Therefore, the OFF light is condensed at a position that is close to the focal plane 117 of the lens 105 with a positive power but different from that of the entrance pupil 109 of the projection optical system 107. Therefore, with a configuration in which a diaphragm is provided in the vicinity of a final plane of the projection optical system 107, the incidence of unnecessary light can be minimized.

Furthermore, a transparent substrate functioning as a protective film of pixels and a part of a structure is placed on the surface of the reflection type light valve 106. A greater part of the incident light 110 on the reflection type light valve 106 generally passes through a transparent substrate, whereas a part thereof is reflected from the transparent substrate. The reflected light is unnecessary light. If the reflected light reaches a screen through the projection optical system, degradation of an image quality, such as a decrease in contrast, is caused.

Thus, if a lens having a convex surface is used as the lens 105 with a positive power as in Embodiment 1, it is preferable that the lens 105 with a positive power is placed so that the convex surface is directed to the reflection type light valve 106. If the lens 105 with a positive power is placed in such a manner, unnecessary light such as light reflected from the transparent substrate can be reflected in a direction away from the optical axis 114. Therefore, the unnecessary light can be kept from being incident upon the projection optical system 107 and being reflected to the reflection type light valve 106, whereby a projected image with a satisfactory contrast can be obtained. As described later, in Embodiment 1, a double-convex lens also can be used as the lens 105 with a positive power. In this case, the surface with a smaller radius of curvature may be directed to the reflection type light valve.

Embodiment 2

Figures 3A, 3B:
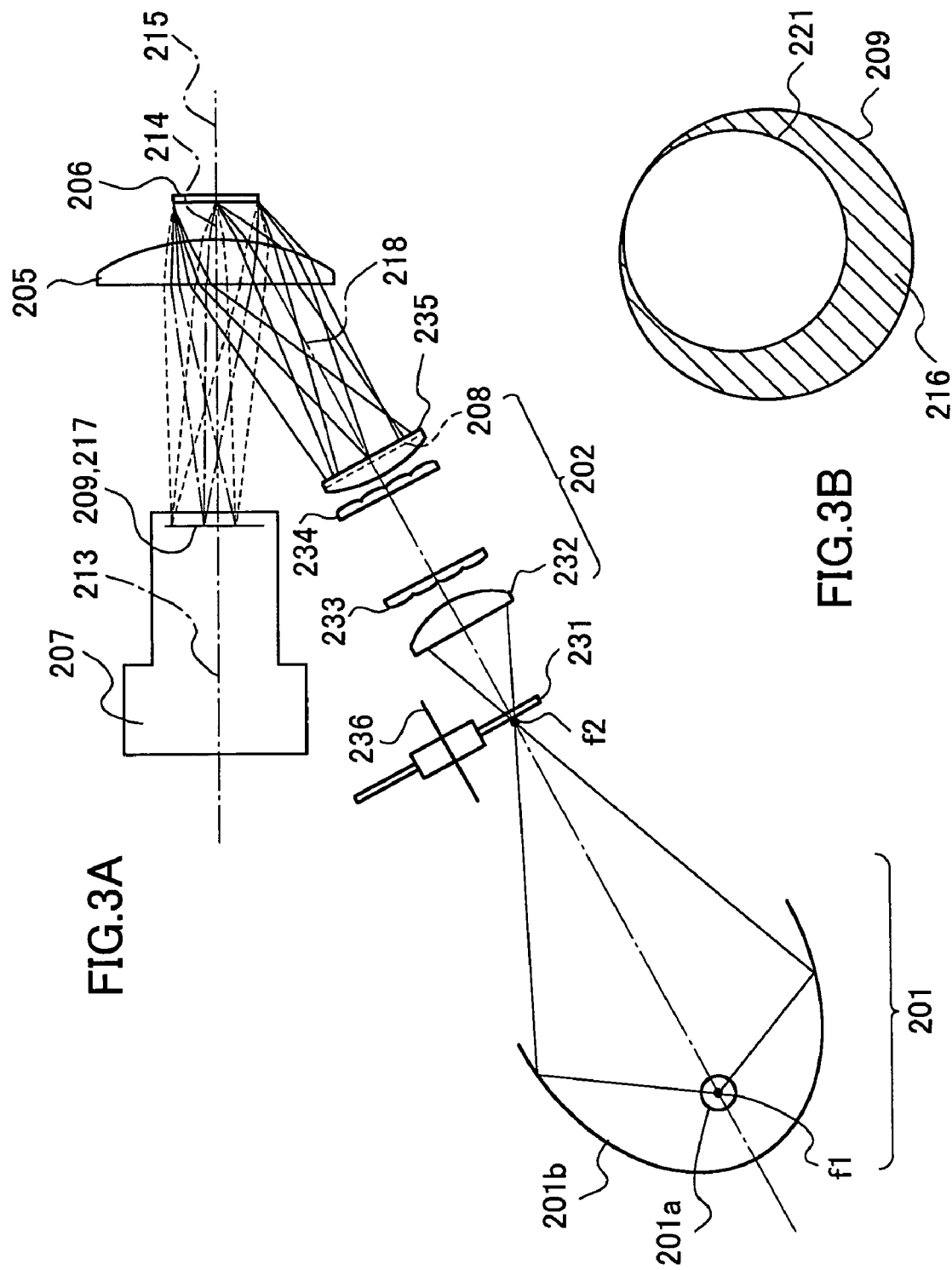
FIG. 3A is a view showing a configuration of a projection type display apparatus according to Embodiment 2 of the present invention.
FIG. 3B is a view showing an entrance pupil of a projection optical system of the projection type display apparatus according to Embodiment 2 of the present invention.
Figure 4:
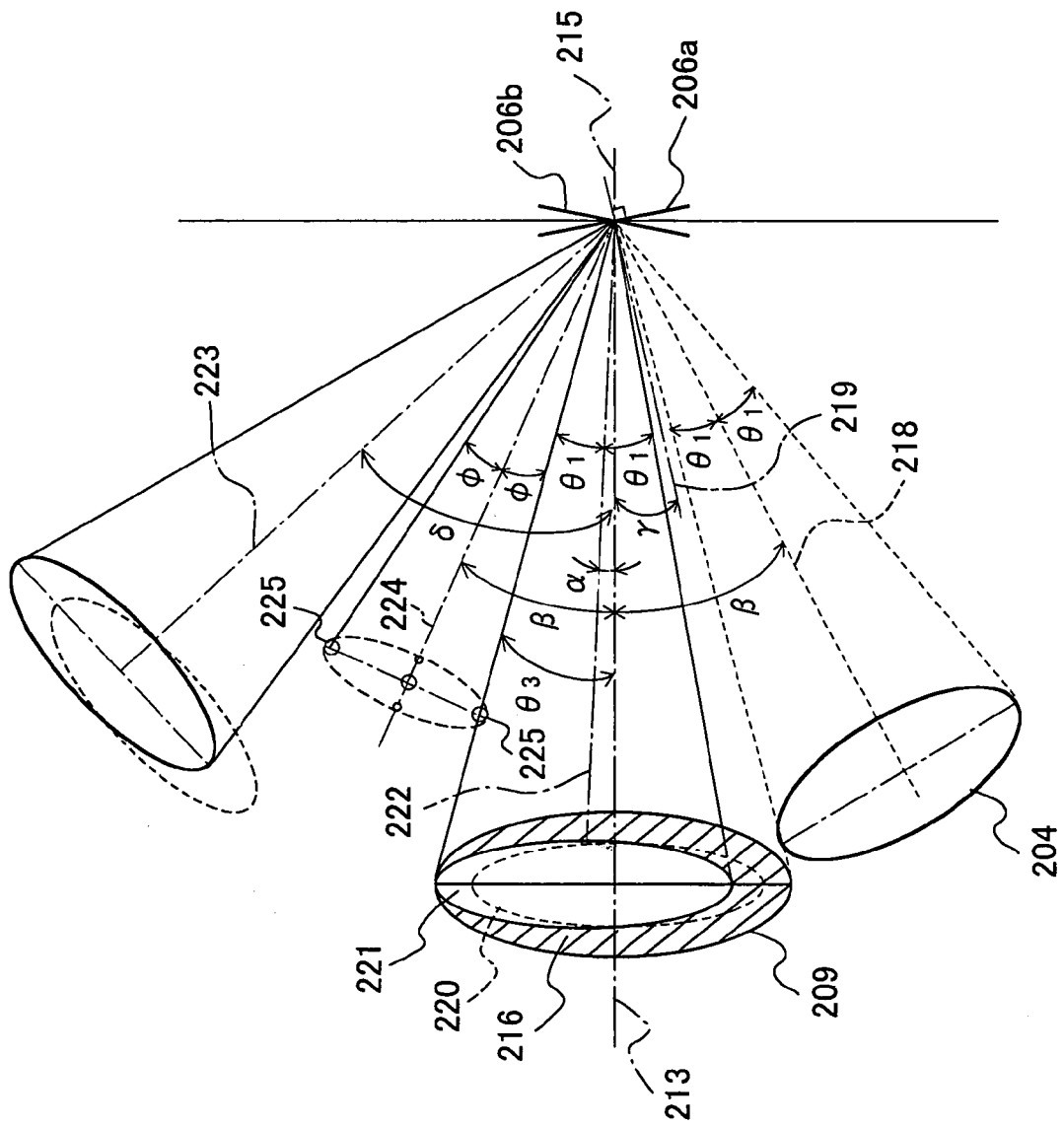
FIG. 4 is an enlarged view showing a central portion of a display region in a reflection type light valve constituting the projection type display apparatus shown in FIG. 3.

Next, a projection type display apparatus according to Embodiment 2 of the present invention will be described with reference to FIGS. 3 and 4. FIG. 3A is a view showing a configuration of the projection type display apparatus according to Embodiment 2 of the present invention. FIG. 3B is a view showing an entrance pupil of a projection optical system of the projection type display apparatus according to Embodiment 2 of the present invention. FIG. 4 is an enlarged view of a central portion of a display region in a reflection type light valve constituting the projection type display apparatus shown in FIG. 3, showing the behavior of luminous fluxes at the central portion. In Embodiment 2, the DMD used in Embodiment 1 also is used as a reflection type light valve. FIGS. 3 and 4 are cross-sectional views taken along a surface perpendicular to a rotation spindle of micro mirrors constituting the DMD.

First, the configuration and operation of the projection type display apparatus according to Embodiment 2 will be described with reference to FIG. 3. As shown in an example in FIG. 3A, the projection type display apparatus according to Embodiment 2 at least includes a light source 201, an illumination optical system 202 for condensing light radiated from the light source 201 to form illumination light, a reflection type light valve (spatial light modulator) 206 for reflecting the illumination light to form an optical image, a projection optical system 207 for projecting the optical image formed by the reflection type light valve 206, and a lens 205 with a positive power positioned between the reflection type light valve 206 and the projection optical system 207, in the same way as in Embodiment 1.

Furthermore, in the same way as in Embodiment 1, the reflection type light valve 206, the projection optical system 207, and the lens 205 with a positive power are placed so that optical axes (215, 213, 214) thereof are matched with each other. Furthermore, the illumination optical system 202 is placed so that illumination light passes through the lens 205 with a positive power and is reflected from the reflection type light valve 206.

The light source 201 is configured in the same way as in Embodiment 1. The light source 201 condenses light from the lamp 201a at the concave mirror 201b, and allows it to be incident upon the illumination optical system 202. Unlike Embodiment 1, the illumination optical system 202 is configured by successively placing a condenser lens 232, a first lens array 233, a second lens array 234, and a relay lens 235.

In the example in FIG. 3, a color wheel 231 is placed at a second focal point f2 of the concave mirror 201b, where light from the light source 201 is condensed. The color wheel 231 has a configuration in which filters of three colors: red (R), green (G), and blue (B) are arranged successively around the circumference, and light passes through a part thereof. The color wheel 231 is provided with, a motor or the like (not shown), whereby the color wheel 231 is rotated at a high speed with respect to an axis 236. Therefore, transmitted light is switched to R, G, and B successively. The light passing through the color wheel 231 is convened to substantially parallel light by the condenser lens 232 having a focal point at the second focal point f2 of the concave mirror 201b.

The converted substantially parallel light is incident upon the first lens array 233. The first lens array 233 is composed of a plurality of lens elements with a positive power, and these plurality of lens elements with a positive power respectively have an opening in a shape substantially similar to that of a display region of the reflection type light valve 206. Furthermore, the second lens array 234 also is composed of a plurality of lens elements with a positive power in the same way as the first lens array 233. Thus, the substantially parallel light incident upon the first lens array 233 is split by a plurality of lens elements constituting the first lens array 233 to form an illuminator image on each lens element constituting the second lens array 234 corresponding to the lens elements constituting the first lens array 233.

The light beams output from the respective lens elements constituting the second lens array 234 pass through the relay lens 235 and the lens 205 with a positive power in the vicinity of the reflection type light valve 206 to illuminate the reflection type light valve 206. At this time, the light beams output from the respective lens elements are overlapped with each other in the display region of the reflection type light valve 206. An output pupil 208 of the illumination optical system 202 is placed substantially in the vicinity of the second lens array 234 and inside the relay lens 235.

The light beams output from the reflection type light valve 206 are converged by the lens 205 with a positive power to be incident upon the entrance pupil 209 of the projection lens system 207. Thus, an optical image formed on the reflection type light valve 206 is projected on a screen by the projection optical system 207 in an enlarged state.

Thus, in Embodiment 2, in the same way as in Embodiment 1, the lens 205 with a positive power placed in the vicinity of the reflection type light valve 206 can separate the incident light to the reflection type light valve 206 from the output light therefrom in a compact configuration, and front projection can be realized without using a total reflection prism. The lens 205 with a positive power is the same as the lens 105 with a positive power described in Embodiment 1, and is placed with a convex surface thereof directed to the reflection type light valve 206.

In Embodiment 2, the output pupil 208 of the illumination optical system 202 and the entrance pupil 209 of the projection optical system 207 are placed in the same way as in Embodiment 1, and they have a conjugate relationship with respect to the lens 205 with a positive power. Therefore, in Embodiment 2, peripheral light can be prevented from being eclipsed by the projection optical system 107 without being able to pass therethrough, and a projected image can obtain the maximum brightness.

In the projection type display apparatus according to Embodiment 2, the entrance pupil 209 of the projection optical system 207 is provided with a diaphragm 216 deflected with respect to the optical axis 213 of the projection optical system 207, as shown in FIG. 3B. Reference numeral 221 denotes an effective region. Therefore, the illumination optical system 202 is placed so that light constituting an optical image from illumination light reflected from the reflection type light valve 206 passes through the diaphragm 216. This will be described with reference to FIG. 4.

FIG. 4 shows an enlarged central portion of the reflection type light valve 206 shown in FIG. 1, as described above, and illustrates only a micro mirror at the center of a display region among those which constitute the reflection type light valve 206. Reference numeral 206a denotes a micro mirror in an ON state, and 206b denotes a micro mirror in an OFF state. Furthermore, only the entrance pupil 209 is shown from the projection optical system 207.

As shown in FIG. 4, it is assumed that $\beta$ represents an angle formed by an optical axis 218 of the illumination optical system and an optical axis 215 (an optical axis 213 of the projection optical system 207) of the reflection type light valve, and $\gamma$ represents an angle formed by a normal 219 of the micro mirror in an ON state and the optical axis 215 of the reflection type light valve. At this time, an angle $\alpha$ formed by a principal ray 222 of a luminous flux output when the reflection type light valve is in an ON state and the optical axis 215 of the reflection type light valve is represented by the following Equation (2).

$$\alpha = \beta - 2\gamma \tag{2}$$

On the other hand, assuming that $\delta$ represents an angle formed by a principal ray 223 of a luminous flux output when the reflection type light valve is in an OFF state and the optical axis 215 (the optical axis 213 of the projection lens system 207) of the reflection type light valve, $\delta$ is represented by the following Equation (3). The luminous flux output in an OFF state becomes unnecessary light.

$$\delta = 4\gamma + \alpha \tag{3}$$

In order to enhance the quality of a projected image, it is necessary to prevent unnecessary light from being incident upon the entrance pupil 209 of the projection optical system 207 and generating stray light inside the lens or to prevent unnecessary light from reaching a screen. Therefore, from the above-mentioned Equation (3), assuming that the angle $\alpha$ is 0 or more, $\delta$ becomes large. Thus, the principal ray 223 is positioned away from the entrance pupil 209 of the projection lens system, whereby the above-mentioned unnecessary light can be prevented from being incident upon the entrance pupil 209.

Furthermore, the light reflected from a transparent substrate provided on the surface of the reflection type light valve also becomes unnecessary light. An angle formed by the principal ray 224 of the unnecessary light and the optical axis 215 (the optical axis 213 of the projection optical system 207) of the reflection type light valve also becomes $\beta$. Thus, by setting the angle $\alpha$ to be 0° or more, the angle $\beta$ formed by the principal ray 224 of the unnecessary light and the optical axis 215 (the optical axis 213 of the projection optical system 207) of the reflection type light valve also becomes large, and the unnecessary light also can be kept from being incident upon the entrance pupil 209 of the projection optical system.

Furthermore, the display region (not shown) of the reflection type light valve has a periodical configuration such as a pixel configuration. Therefore, as the definition of a projected image is being enhanced, the size of the pixels (micro mirrors) on the reflection type light valve is decreased, and the pitch of the periodical configuration also is decreased. In general, when light is incident upon the object having a periodical configuration, diffracted light is generated, in addition to a general light beam traveling straight. The diffracted light is generated in a discrete manner and a bright spot satisfies the following Equation (4). In Equation (4), $\theta$ represents an angle formed by an optical axis and a bright spot, N represents an integer, $\lambda$ represents a wavelength, and d represents a pitch of a periodical configuration.

$$n\lambda = d \sin \theta \tag{4}$$

Thus, in FIG. 4, it can be considered that diffracted light is generated from the reflection type light valve in a discrete manner with respect to the optical axis 224 when the above equation (4) is satisfied. The light with the largest intensity in the above-mentioned diffracted light is represented by a 1st-order term. An angle $\phi$ formed by the optical axis 224 and the 1st order diffracted light 225 can be represented by the following Equation (5).

$$\sin \theta = \lambda/(nd) \tag{5}$$

On the other hand, as is understood from FIG. 4, $\beta$ also satisfies the relationship represented by the following Equation (6). $\theta_1$ represents a spread angle of light incident upon the projection optical system by being reflected from the reflection type light valve as described above.

$$\beta = 2\theta_1 + 2\alpha \tag{6}$$

From the above Equation (6), in order to prevent the 1st order diffracted light due to the periodical configuration of the reflection type light valve 206 from being overlapped with the ON light of the reflection type light valve, i.e., in order to prevent unnecessary light from being incident upon the entrance pupil 209 of the projection optical system, the condition of the following Equation (7) needs to be satisfied.

$$\alpha > \phi \tag{7}$$

In the case where the principal ray 222 of luminous fluxes output when the reflection type light valve is in an ON state is matched with the optical axis 215 of the reflection type light valve, i.e., in the case where $\alpha$ is 0°, an effective region is represented by a dotted line 220. However, when the principal ray 222 is tilted ($\alpha > 0$), the effective region is shifted upward in the figure, and the effective region in this case is represented by reference numeral 221 also shown in FIG. 3B. Thus, in the present embodiment, the diaphragm 216 is provided for light shielding so that unnecessary light passes through a region other than the effective region 221 in the entrance pupil 209 of the projection optical system. Because of this, the reflected light output from the reflection type light valve in an ON state is allowed to reach a screen, and unnecessary light such as diffracted light and light reflected from the transparent substrate can be eliminated.

Furthermore, in this case, the entrance pupil 209 may include the effective region 221, as shown in FIG. 4. Thus, the F-number F1 of the projection optical system preferably satisfies the following Equation (8).

$$F1 = 1/(2 \sin(\theta_1 + \alpha)) \tag{8}$$

For example, in the case where a pixel pitch of the reflection type light valve is about 14 μm, the 1st order diffracted light is generated in a range of being tilted by about 2.4° ($\phi = 2.4°$) with respect to the optical axis 224. Therefore, it is preferable that the effective entrance pupil (effective region 221) of the projection optical system is deflected at an angle larger than 2.4° ($\alpha = 2.4$) with respect to the optical axis 213 (see Equation (7)). In this case, assuming that a tilt angle of the micro mirrors (206a, 206b) is +10°, the F-number of the projection optical system becomes about 2.4 from the above-mentioned Equation (8), with respect to about 3 in the absence of deflection.

As described above, in the projection type display apparatus according to Embodiment 2, the deflected diaphragm 216 is provided at the entrance pupil 209 of the projection optical system, whereby luminous fluxes forming an image from the reflection type light valve are allowed to pass through these diaphragms. More specifically, in Embodiment 2, the angle α formed by the principal ray 222 of the luminous flux output when the reflection type light valve is in an ON state and the optical axis 215 of the reflection type light valve is set to be larger than 0°. Furthermore, a region other than the effective region 221 is shielded against light. Thus, unnecessary light can be kept from being incident upon the entrance pupil 209 of the projection light system, and the image quality of a projected image can be enhanced. In Embodiment 2, the diaphragm has a circular shape; however, Embodiment 2 is not limited thereto. For example, the diaphragm may have an oval shape.

Furthermore, since the projection optical system is provided with the deflected diaphragm 216, it is not preferable that a lens or a lens group provided with a diaphragm is rotated so as to adjust a focal point in a forward and backward direction by this rotation. Therefore, in Embodiment 2, as means for adjusting a focal point of the projection optical system, it is preferable to adjust a focal point only by moving a lens group in an optical axis direction without rotating them. In particular, it is preferable to adjust a focal point by moving only a front lens group constituting the projection optical system. A specific example includes means for adjusting a focal point using an advancing helicoid. If a focal point is adjusted by rotating only a lens group without being provided with a deflected diaphragm, it is preferable to use such means for adjusting a focal point.

Embodiment 3

Figure 5:
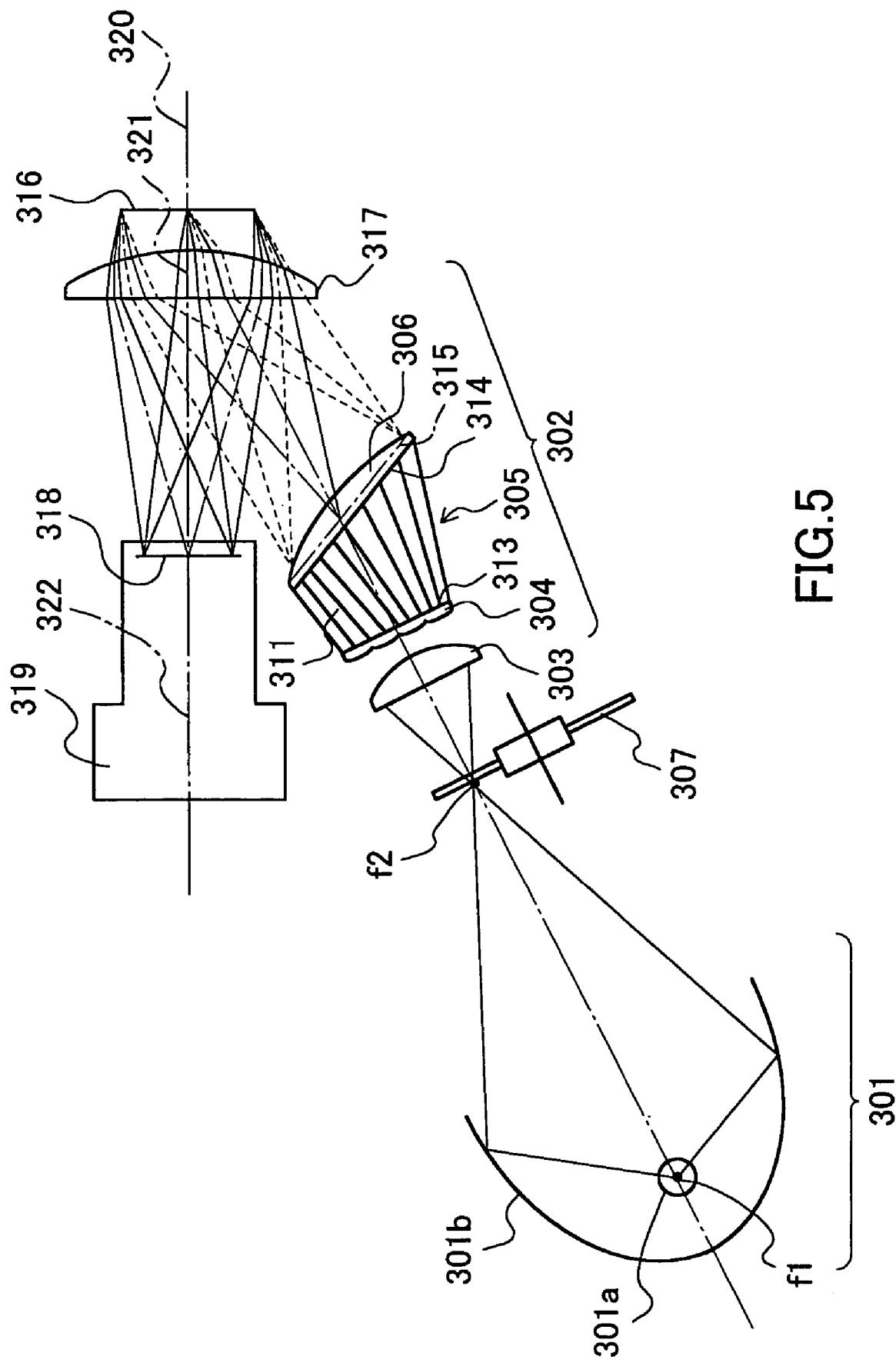
FIG. 5 is a view showing a configuration of the projection type display apparatus according to Embodiment 3 of the present invention.
Figure 6:
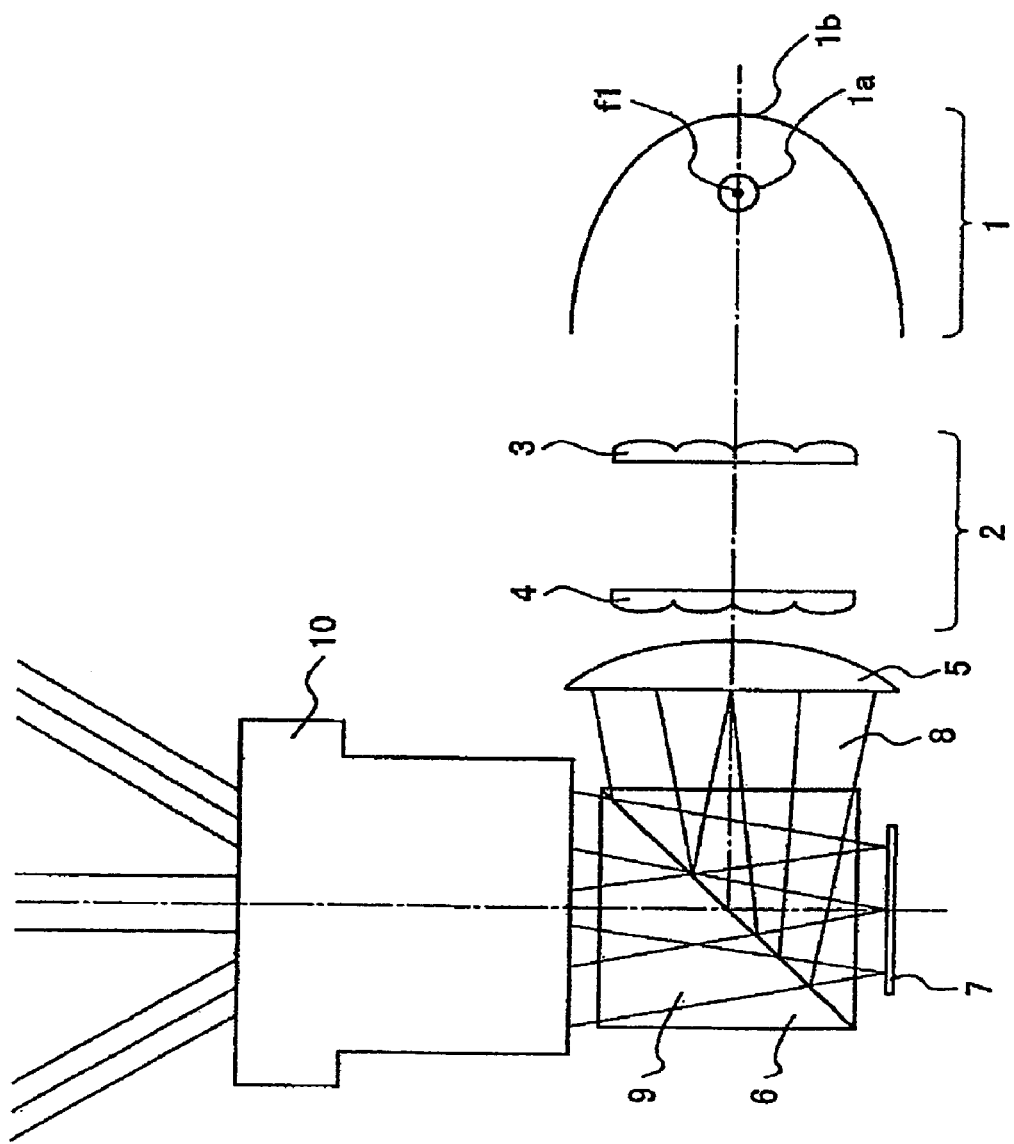
FIG. 6 is a view showing an example of an optical system of a conventional projection type display apparatus using a reflection type light valve.
Figure 7:
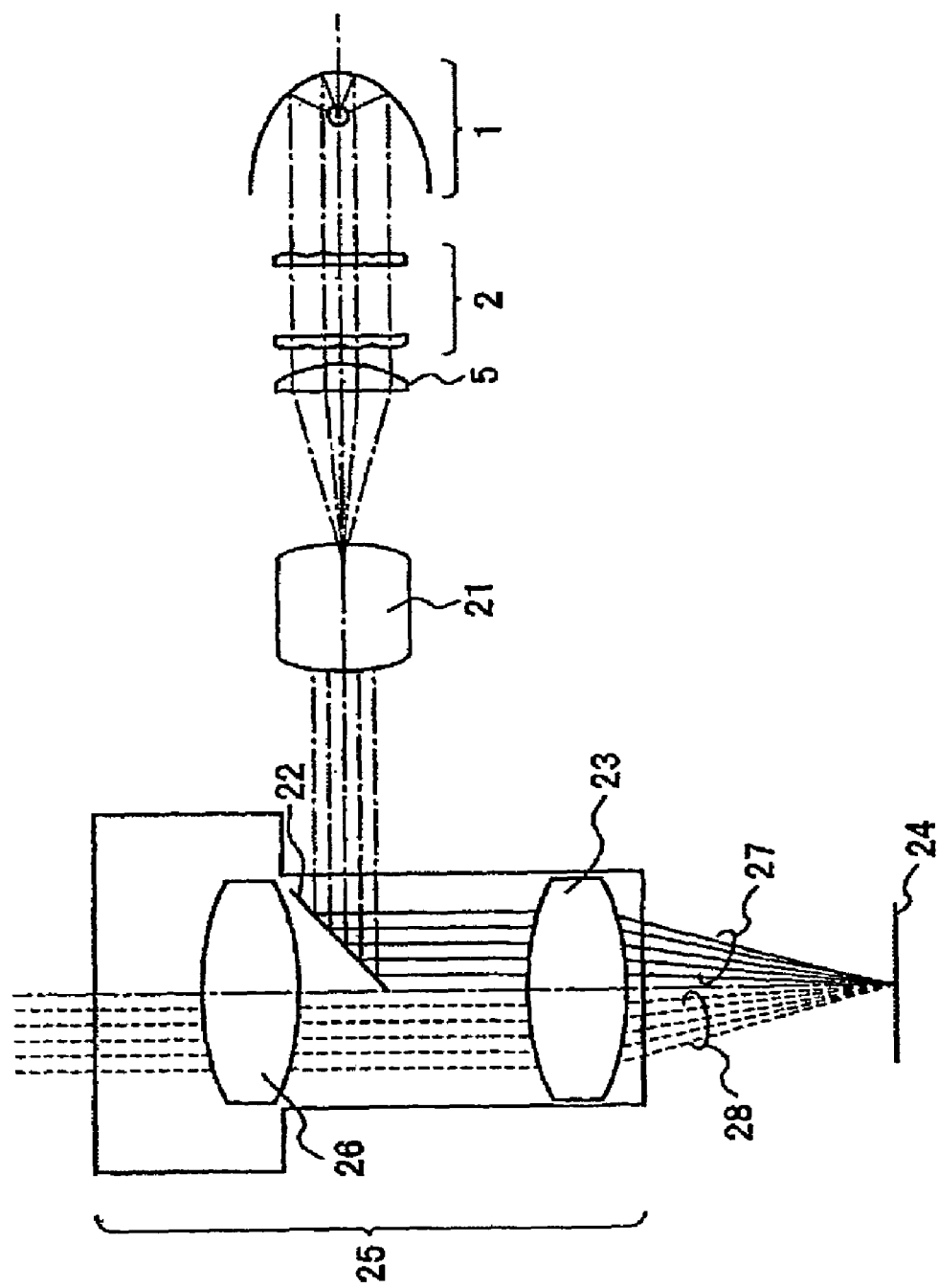
FIG. 7 is a view showing another example of the optical system of the conventional projection type display apparatus using a reflection type light valve.

Next, a projection type display apparatus according to Embodiment 3 of the present invention will be described with reference to FIG. 5. FIG. 5 is a view showing a configuration of the projection type display apparatus according to Embodiment 3 of the present invention. In Embodiment 3, as a reflection type light valve, a DMD also is used in the same way as in Embodiment 1. FIG. 5 shows a cross-section taken along a surface perpendicular to a rotation spindle of micro mirrors constituting the DMD.

The configuration and operation of the projection type display apparatus according to Embodiment 3 will be described with reference to FIG. 5. As shown in an example in FIG. 5, the projection type display apparatus according to Embodiment 3 at least includes a light source 301, an illumination optical system 302 for condensing light radiated from the light source 301 to form illumination light, a reflection type light valve (spatial light modulator) 316 for reflecting the illumination light to form an optical image, a projection optical system 319 for projecting the optical image formed by the reflection type light valve 316, and a lens 317 with a positive power positioned between the reflection type light valve 316 and the projection optical system 319.

The light source 301 is configured in the same way as in the first example, and condenses light from the lamp 301a by a concave mirror 301b and allows the light to be incident upon the illumination optical system 302. The illumination optical system 302 is configured by successively placing a condenser lens 303, a lens array 304 for splitting luminous fluxes, a light guide 305, and a relay lens 306.

Furthermore, in the same way as in Embodiment 1, the reflection type light valve 316, the projection optical system 319, and the lens 317 with a positive power are placed so that optical axes (320, 322, 321) thereof are matched with each other. The illumination optical system 302 is placed so that illumination light passes through the lens 317 with a positive power and is reflected from the reflection type light valve 316.

In the same way as in Embodiments 1 and 2, the light source 301 is composed of a lamp 301a and a concave mirror 301b. A color wheel 307 similar to that in Embodiment 2 is placed at a second focal point f2 of the concave mirror 301b, and transmitted light is switched to R, G, and B successively. Unlike Embodiments 1 and 2, the illumination optical system 302 is configured by placing the condenser lens 303, the lens array 304 for splitting luminous fluxes, the light guide 305 composed of a plurality of stacked optical fibers 311, and the relay lens 306 successively.

The light passing through the color wheel 307 is converted to substantially parallel light by the condenser lens 303 having a focal point at the second focal point f2 of the concave mirror 301b. The converted substantially parallel light passes through the lens array 304 to be incident upon each optical fiber 311 of the light guide 305. The light beam incident upon each optical fiber 311 of the light guide 305 undergoes repeated reflection inside the fiber to be output.

The light beam output from an output pupil 315 of the illumination optical system 302 is incident upon the reflection type light valve 316 in a telecentric manner by the lens 317 with a positive power placed in the vicinity of the display region of the reflection type light valve 316. The light beam output from the reflection type light valve 316 is converged by the lens 317 with a positive power and is incident upon an entrance pupil 318 of the projection optical system 319. An optical image formed on the reflection type light valve 316 is projected on a screen by the projection optical system 319 in an enlarged state.

Thus, in Embodiment 3, in the same way as in Embodiment 1, the lens 317 with a positive power placed in the vicinity of the reflection type light valve 316 can separate the incident light to the reflection type light valve 316 from the output light therefrom in a compact configuration, and front projection can be realized without using a total reflection prism.

In the above-mentioned projection type display apparatuses in Embodiments 1 and 2, each element of the illumination optical system (102, 202) is perpendicular to the optical axis of the illumination optical system. However, the illumination optical system (102, 202) is placed so that an optical axis thereof is tilted with respect to the optical axis of the lens (105, 205) with a positive power and the optical axis of the reflection type light valve (106, 206). Therefore, according to the "Shineproof Theorem", the shape of illumination light reaching the reflection type light valve (106, 206) may be a tilted rectangular form of a rhombus, a trapezoid, or the like. In this case, there is a possibility that light output from the reflection type light valve (106, 206) has its luminous flux density increased downward in the figure, and a luminous flux distribution becomes nonuniform.

Furthermore, when light output from the reflection type light valve (106, 206) passes through the lens (105, 205) with a positive power, luminous fluxes are refracted. The diffraction direction and diffraction force thereof are varied depending upon which portion of the display region of the reflection type light valve (106, 206) these fluxes are reflected from. Therefore, in an entrance pupil (109, 209) of the projection optical system, there is a possibility that a luminous flux density also is increased downward in the figure, and a luminous flux distribution becomes nonuniform.

When such a nonuniform luminous flux distribution occurs, a partial region of an output pupil (108, 208) of the illumination optical system and a partial region in the entrance pupil (109, 209) of the projection optical system cannot keep a conjugate relationship with respect to the lens with a positive power, which may result in nonuniform brightness of a projected image.

Therefore, in Embodiment 3, the illumination optical system 302 is configured using the light guide 305. As described above, the light guide 305 is configured by stacking a plurality of optical fibers 311, and the output pupil 315 of the illumination optical system 302 is composed of output light from the plurality of optical fibers 311 placed so that the plane of incidence of each optical fiber is disposed two-dimensionally. Thus, the output pupil 315 of the illumination optical system 302 has a plurality of partial pupil elements, and the shape of the output pupil 315 becomes a plane obtained by connecting a plurality of partial pupil elements. In Embodiment 3, this plane may be a free-curved surface.

Furthermore, as shown in FIG. 5, a plurality of optical fibers 311 are arranged uniformly on a plane of incidence 318, and arranged nonuniformly on an output plane 314. In the example shown in FIG. 5, the density of the optical fibers 311 is decreased downward in the figure on the output plane 314. Therefore, the luminous flux distribution of illumination light output from the illumination optical system 302 is nonuniform at a time of output; however, it becomes uniform when reflected from the reflection type light valve. More specifically, according to the "Shineproof Theorem", the shape of illumination light reaching the reflection type light valve 316 is suppressed from becoming a tilted rectangle.

Thus, the entire or substantially entire region of the entrance pupil 318 of the projection optical system 319 and the entire or substantially entire region of the output pupil 315 of the illumination optical system 302 satisfy a satisfactory conjugate relationship, and the illumination light output from the output pupil 315 of the illumination optical system 302 passes through the entrance pupil 318 of the projection optical system 319 to a maximum degree.

In Embodiment 3, as described above, the entrance pupil 318 of the projection optical system 319 and the output pupil 315 of the illumination optical system 302 are placed so as to have a conjugate relationship with respect to the lens 317 with a positive power. Therefore, according to the "Shineproof Theorem", by appropriately controlling the luminous flux distribution of the output pupil 315 of the illumination optical system 302, the luminous flux distribution on the entrance pupil 318 of the projection optical system 319 can be made uniform, whereby a projected image with uniform brightness can be obtained.

In Embodiment 3, the illumination optical system 302 is not limited to the embodiment using the light guide 305. The illumination optical system 302 may have a configuration in which a plurality of lens arrays composed of a plurality of lens elements with a positive power are placed instead of the light guide 305. In this configuration, as the lens elements with a positive power constituting the lens arrays, those which have different focal lengths are used, whereby a luminous flux distribution of illumination light output from the illumination optical system can be controlled appropriately. In this embodiment, the luminous flux distribution of illumination light reflected from the reflection type light valve can be made uniform.

Furthermore, in Embodiment 3, the projection optical system 319 can be provided with a diaphragm (the diaphragm 216 shown in FIG. 4) similar to that described in Embodiment 2. In this case, it is required that the illumination optical system 302 is placed so that light constituting an optical image from illumination light reflected from the reflection type light valve 316 passes through the diaphragm. Furthermore, in this case, the F-number of the projection optical system preferably satisfies the above-mentioned Equation (8) in the same way as in Embodiment 2.

As described in Embodiments 1 to 3, the lens with a positive power is composed of one lens element. However, the lens with a positive power is not limited thereto according to the present invention, and may be a lens group composed of a plurality of lens elements. Furthermore, according to the present invention, the shape of the lens with a positive power is not limited to a plano-convex lens shown in FIGS. 1 and 2. The shape of the lens with a positive power may be a double-convex lens or a meniscus lens as long as it has a positive power.

Furthermore, in the projection type display apparatus described in Embodiments 1 to 3, there is one reflection type light valve. However, according to the present invention, a plurality of reflection type light valves also can be used. In this case, it is required to provide a color separation optical system for allowing monochrome light to be incident upon each reflection type light valve and a color combination optical system for combining light output from each reflection type light valve.

In Embodiments 1 to 3, the movable range of the micro mirrors constituting the respective pixels of the reflection type light valve is ±10°. However, the present invention is not limited to this example. According to the present invention, the movable range of the micro mirrors should be set in accordance with the characteristics of a reflection type light valve to be used so that an optimum light output and a high contrast can be obtained.

INDUSTRIAL APPLICABILITY

As described above, according to the present invention, by placing a lens with a positive power in the vicinity of a reflection type light valve display region, the effective aperture of an entrance pupil of a projection optical system and an output pupil of an illumination optical system can be decreased even in a telecentric optical system. Thus, the optical paths of incident light and output light can be separated from each other in a compact configuration. This makes it unnecessary to use means for separating illumination light from projected light, such as a conventionally used total prism splitter. Consequently, front projection can be performed in a telecentric optical system while decreasing cost, and the image quality in a projection plane can be made uniform. More specifically, according to the present invention, a compact display optical system of high image quality, using a reflection type display light valve, can be realized at low cost. Furthermore, the projection type display apparatus according to the present invention can ensure a uniform image obtained by front projection, and obtain a degree of design freedom with respect to a larger projection view angle and higher performance.

The invention claimed is:

1. A projection type display apparatus, comprising:
   a light source;
   an illumination optical system for condensing light radiated from the light source to form illumination light;
   a reflection type light valve for reflecting the illumination light to form an optical image; a projection optical system for projecting the optical image formed by the reflection type light valve; and
   a lens with positive power positioned between the reflection type light valve and the projection optical system,
   wherein the reflection type light valve, the projection optical system, and the lens with a positive power are disposed so that optical axes thereof are matched with each other,
   the illumination optical system is disposed so that the illumination light passes through the lens with a positive power to be reflected from the reflection type light valve,
   an output pupil of the illumination optical system and an entrance pupil of the projection optical system have a conjugate relationship with respect to the lens with a positive power, and
   an optical axis of the reflection type light valve, an optical axis of the projection optical system, and an optical axis of the reflection type light valve are all positioned on an identical straight line.

2. The projection type display apparatus according to claim 1, wherein the projection optical system has a diaphragm deflected with respect to the optical axis of the projection optical system, and
   the illumination optical system is disposed so that the illumination light passes through the lens with a positive power to be reflected from the reflection type light valve, and light constituting the optical image from the reflected illumination light passes through the diaphragm.

3. The projection type display apparatus according to claim 2, wherein the diaphragm of the projection optical system is deflected in a direction away from an optical axis of the illumination optical system.

4. The projection type display apparatus according to claim 2, wherein the projection optical system has means for adjusting a focal point with only movement in an optical axis direction.

5. The projection type display apparatus according to claim 2, satisfying the following Equation (1):

$$F1 = 1/(2\sin(\theta_1 + \alpha)) \quad (1)$$

where F1 is an F-number of the projection optical system, $\theta_1$ is a spread angle of light that is output from the illumination optical system and is reflected from the reflection type light valve to be incident upon the projection optical system, and $\alpha$ is an angle formed by a principal ray output from a center of a display region of the reflection type light valve and the optical axis of the projection optical system.

6. The projection type display apparatus according to claim 1, wherein the output pupil of the illumination optical system has a plurality of partial pupil elements, and a luminous flux distribution of the illumination light becomes uniform when the illumination light is reflected from the reflection type light valve.

7. The projection type display apparatus according to claim 1, wherein the output pupil of the illumination optical system, the entrance pupil of the projection optical system and the lens with a positive power are disposed so that 80% or more of luminous fluxes passing through the output pupil of the illumination optical system is incident upon an effective region of the entrance pupil of the projection optical system.

8. The projection type display apparatus according to claim 1, wherein the lens with a positive power is composed of one piano-convex lens with a convex surface directed to a display region of the reflection type light valve.

* * * * *